United States Patent [19]
Bahoshy et al.

[11] 3,897,566
[45] July 29, 1975

[54] CHEWING GUMS HAVING LONGER LASTING SWEETNESS AND FLAVOR

[75] Inventors: Bernard J. Bahoshy, Mahopac, N.Y.; Charles E. Flynn, Oradill, N.J.; Gary P. Malunis, White Plains, N.Y.

[73] Assignee: General Foods Corporation, White Plains, N.Y.

[22] Filed: Dec. 6, 1973

[21] Appl. No.: 422,371

[52] U.S. Cl. ................... 426/3; 426/168; 426/221
[51] Int. Cl. ......................... A23g 3/00; A23g 3/30
[58] Field of Search .......... 426/3, 4, 5, 6, 168, 221, 426/223, 96

[56] References Cited
UNITED STATES PATENTS

| | | | |
|---|---|---|---|
| 2,631,119 | 3/1953 | Ferguson | 426/3 |
| 2,886,441 | 5/1959 | Kramer | 426/5 |
| 3,681,087 | 8/1972 | Johnson | 426/3 |

Primary Examiner—A. Louis Monacell
Assistant Examiner—J. M. Hunter
Attorney, Agent, or Firm—Bruno P. Struzzi; Daniel J. Donovan; Doris M. Bennett

[57] ABSTRACT

Chewing gums of longer lasting sweetness and flavor are prepared from compositions comprising a gum base, sweeteners, flavors and an effective amount of gelatin-fixed monosodium glutamate.

7 Claims, No Drawings

CHEWING GUMS HAVING LONGER LASTING SWEETNESS AND FLAVOR

BACKGROUND OF THE INVENTION

This invention relates to chewing gums and more particularly to flavored chewing gums with a longer lasting sweetness and flavor.

Chewing gums generally comprise a chewable gum base such as chicle, its substitutes, mixtures thereof, and the like. Incorporated within this gum base may be plasticizers or softeners to improve the consistency and texture of the gum, flavors, and sweetening agents such as sugar or corn syrup or, for sugarless gums, artificial sweeteners.

It is found that one of the limitations of currently available chewing gums is their rapid loss of both flavor and sweetness occurring after about 3 to 5 minutes of chewing. Attempts at obviating this problem have been directed towards delaying the initial flavor release but such attempts have generally been hampered both by their lack of flavor up to the time of release, and by their excessively strong flavor impact at the time of release.

It is accordingly an object of this invention to produce flavored chewing gums of substantially longer lasting, sustained sweetness and flavor than currently available products.

This and other objects will become apparent upon reading the specification and claims which follow.

SUMMARY OF THE INVENTION

It has been found in accordance with this invention that a flavored chewing gum of longer lasting sweetness and flavor may be prepared through the addition of an effective amount of gelatin-fixed monosodium glutamate to the gum product. This invention is applicable to both sugarless and sugar-containing chewing gums and gums prepared from the compositions of this invention have been found to exhibit a sweetness and flavor extension of up to one and one-half minutes and greater over commercially available products.

DETAILED DESCRIPTION OF THE INVENTION

The chewing gums of this invention comprise a gum base, sweeteners, flavors, and an amount of gelatin-fixed monosodium glutamate effective to produce a flavor and sweetness extension.

The gum base may be any chewable, substantially water insoluble base such as chicle and substitutes thereof, guttakay, sorva, jelutong, synthetic polymers such as polyvinyl acetate, synthetic resins, rubbers, and the like, and mixtures of these materials. The amount of gum base employed may vary widely depending upon the type base used, the other ingredients making up the final gum product, and other like factors. Generally, however, it has been found that anywhere from about 15 to about 40% by weight of the final gum composition may be used, and preferably from about 20 to about 30%. Plasticizers or softeners such as lanalin, propylene glycol, glycerol, and the like, and mixtures thereof may optionally be incorporated within the gum base to achieve a desired texture and consistency.

Generally, the flavors employed in flavored chewing gums may be the essential oils or synthetic flavors or mixtures of these. Flavors such as wintergreen, spearmint, peppermint, birch, anise, fruit flavors, and the like may be used satisfactorily with a variety of gum bases. The amount of flavoring material is normally a matter of preference but may be subject to the consideration of such factors as the type flavor used, the type base used, and the like.

The remaining portion of the gum composition is generally a sweetening agent such as sugar or, for sugarless gums, a sugar substitute. By sugar we mean sucrose, dextrose, corn syrup solids, and the like, and mixtures thereof. Sugar substitutes may be any artificial sweetening agent normally used in sugarless chewing gums such as mannitol, sorbitol, saccharin, cyclamate, dipeptide sweeteners such as described in U.S. Pat. No. 3,492,131 issued Jan. 27, 1970, especially L-aspartyl-phenylalanine methyl ester, and the like, or mixtures of these.

The loss of flavor impact and sweetness in a flavored chewing gum generally occurs after about three to five minutes of chewing. It has been found that the addition to the gum composition of gelatin-fixed monosodium glutamate is effective in extending the time period over which both sweetness and flavor are discernible. The term "gelatin-fixed," as used herein, means uniformly distributing the flavor and sweetness extending material in a gelatin solution and then drying the resultant solution.

Gelatin fixation of the material may be achieved through a wide variety of processing methods. These methods may include freeze drying a mixture of gelatin and the material to be fixed, spray-drying, drum drying, slab drying, oven drying, tray drying, pan drying, or other well-known drying techniques. Gelatin fixation may also be achieved through the use of other physical techniques such as coacervation, and other like methods.

The gelatin which may be employed in the practice of this invention may be any of the grades and types of gelatin, including those obtained from tanner's stock, pigskin, and the like. The Bloom of the gelatin used is not critical and may vary widely, that is, anywhere from about 50 or less to as high as about 250.

The amount of gelatin used in fixing the monosodium glutamate may vary widely subject to the necessity of using enough to effectively fix the component and the undesirability of using excessive amounts of gelatin which may adversely effect the texture of the finished gum product. Generally, it is found that within a gelatin-fixed particle the amount of material to be fixed may be anywhere from about 10% by weight of the gelatin to about 100% by weight of the gelatin without adversely effecting the gum product.

The preparation of the chewing gums of this invention is achieved through more or less conventional methods including a softening of the gum base through mixing, addition of sweetener to the base, addition of the flavor extending compound to the mixture, followed by addition of the flavoring materials and formation of the gum into suitable forms such as sticks.

The monosodium glutamate is added to the gum in an amount effective to produce a noticeable flavor and sweetness extension. This amount is preferably from about 0.1 to about 1.0% by weight of the final gum composition, and most preferably about 0.2 to 0.3%.

In order to measure the flavor and sweetness duration in a chewing gum, taste tests were conducted using trained personnel to evaluate the time versus intensity of flavor and sweetness. Panel members are given a stick of gum and asked to chew and record their values for flavor intensity at thirty second intervals. Comparisons of experimental gum samples are made against a sample of a control gum formulation and the time versus intensity values are used to assign a "flavor duration" value to each sample. For the purposes of the testing, flavor duration is defined as the chewing time in minutes for the gum flavor to become just barely detectable. Thus, flavor extension is the difference between the flavor duration of the control and the experimental sample.

The following examples will serve to illustrate specific embodiments of the invention and the quantitative results of taste-panel testing.

EXAMPLE I

In order to evaluate the flavor and sweetness extension obtained through the use of the gelatin-fixed monosodium glutamate, gum samples were prepared from the following ingredients:

| Ingredient | % by Weight Composition | | |
|---|---|---|---|
| | A | B | C |
| Chewing Gum Base | 23.993 | 23.993 | 23.993 |
| Sugar | 58.937 | 58.737 | 58.737 |
| Corn Syrup, 46° | 14.245 | 14.245 | 14.245 |
| Glycerol | 0.749 | 0.749 | 0.749 |
| Flavor | 1.276 | 1.276 | 1.276 |
| Gelatin | 0.800 | 0.800 | |
| Monosodium Glutamate (MSG) | | 0.200 | |
| Gelatin-fixed MSG (20% MSG) | | | 1.000 |

Gelatin fixation was achieved through slab-drying techniques. For Sample C, 160 grams of gelatin were mixed with 40 grams of monosodium glutamate. The mixture was stirred into 800 ml of water, heated to solution, and poured into a tray in a layer of about three-sixteenths of an inch. The solution was cooled to about 40° to 50°F to form a firm gel which was cut into squares, dried at 100°F in a forced air oven, and ground for use in the gum formulation.

For the gum preparation, the gum base was softened for 10 minutes at 150°F in a mixer, the glycerol added and mixed for 10 minutes, and the corn syrup added as mixing continued for 10 minutes. The appropriate amount of MSG was blended with the sugar and added to the mixer in two portions with 10 minutes mixing after each addition. The flavor was then added, the gum was removed from the mixer, and then rolled and scored into sticks.

EXAMPLE II

| Sample | Description | Flavor Duration (Min.) |
|---|---|---|
| A | Control | 5.5 |
| B | Unfixed MSG (0.2%) | 5.5 |
| C | Fixed MSG (0.2%) | 6.5 |

It can be seen from the above values that the fixed MSG provides a significant flavor and sweetness extension while the unfixed MSG produces no extension over the control chewing gum.

EXAMPLE III

A sugarless chewing gum is prepared according to Example I from the following ingredients:

| Ingredient | % Composition by Weight |
|---|---|
| Sorbitol | 50.0 |
| Gum Base | 34.9 |
| Mannitol | 8.1 |
| Glycerol | 2.8 |
| Water | 1.4 |
| Flavor | 1.1 |
| Saccharin | 0.2 |
| Gelatin Fixed MSG (20% MSG) | 1.5 |

While the above invention has been described with reference to the above examples, they are intended to be merely illustrative of the many and varied embodiments of the invention. Obvious variations in the ingredients used, their level of addition, and other like modifications are believed to be within the scope of this invention.

We Claim:

1. A chewing gum consisting essentially of a gum base, sweetener, flavor, and monosodium glutamate, said monosodium glutamate being fixed in gelatin and present in an amount effective to produce a longer lasting sweetness and flavor in said chewing gum.

2. The chewing gum of claim 1 wherein said sweetener is sugar. 1.0%,

3. The chewing gum of claim 1 wherein said sweetener is a sugar substitute.

4. The chewing gum of claim 1 wherein said amount of monosodium glutamate is from about 0.1 to about 1.0%, percents by weight of the final gum composition.

5. The chewing gum of claim 4 wherein said amount of monosodium glutamate is fixed in an amount of gelatin at least equal in weight to the weight of said monosodium glutamate.

6. The chewing gum of claim 5 wherein said monosodium glutamate is fixed in gelatin by means of slab drying.

7. The chewing gum of claim 4 wherein said amount of monosodium glutamate is from about 0.2 to 0.3% by weight of the final gum composition.

* * * * *

UNITED STATES PATENT OFFICE
CERTIFICATE OF CORRECTION

Patent No. 3,897,566  Dated July 29, 1975

Inventor(s) Bernard J. Bahoshy, et al.

It is certified that error appears in the above-identified patent and that said Letters Patent are hereby corrected as shown below:

In column 4, line 2 of claim 2, delete "1.0%".

Signed and Sealed this twenty-second Day of June 1976

[SEAL]

Attest:

RUTH C. MASON
Attesting Officer

C. MARSHALL DANN
Commissioner of Patents and Trademarks